Oct. 3, 1950     G. C. PITTENGER ET AL     2,524,135

POULTRY FEEDER

Filed Aug. 9, 1946

INVENTOR:
GLENN C. PITTENGER
ROY L. BRANDENBURGER

BY

ATTORNEY.

Patented Oct. 3, 1950

2,524,135

UNITED STATES PATENT OFFICE 2,524,135

POULTRY FEEDER

Glenn C. Pittenger, St. Louis, and Roy L. Brandenburger, Clayton, Mo., assignors to Ralston Purina Company, St. Louis, Mo., a corporation of Missouri Application August 9, 1946, Serial No. 689,570

3 Claims. (Cl. 119—61)

Our invention pertains to supporting means for troughs and particularly to trough type poultry feeders and its object is to provide improved, convenient, and inexpensive means for adjusting the trough height whereby a single feeder may readily be rendered suitable for feeding requirements of different sizes of poultry. A feeder constructed in accordance with our adjustment of height of a feeder trough requires no release of nuts, screws or clamps, nor the employment of tools of any kind.

Figure 1:
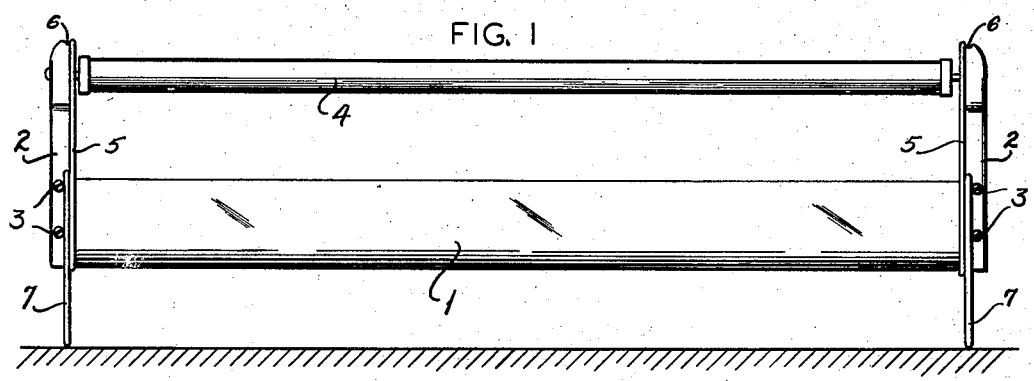
Figure 2:
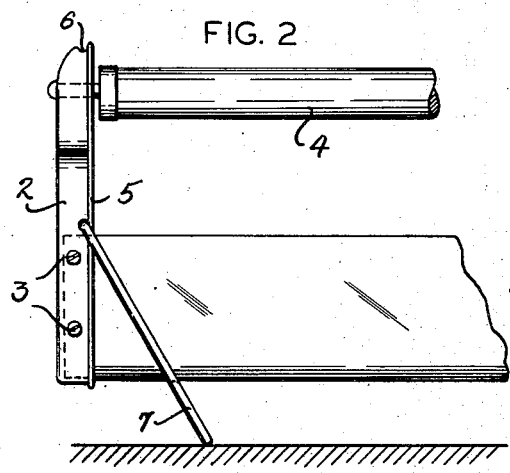
Figure 3:
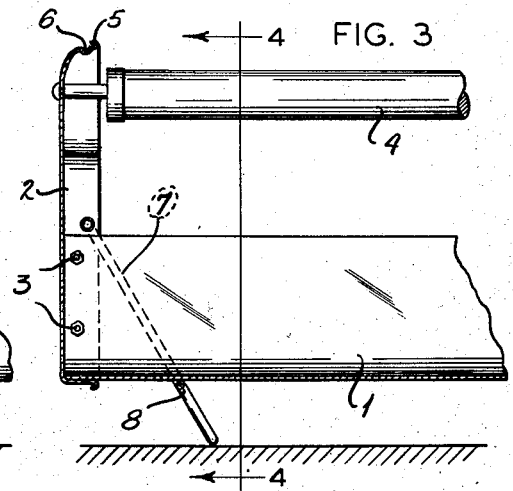
Figure 4:
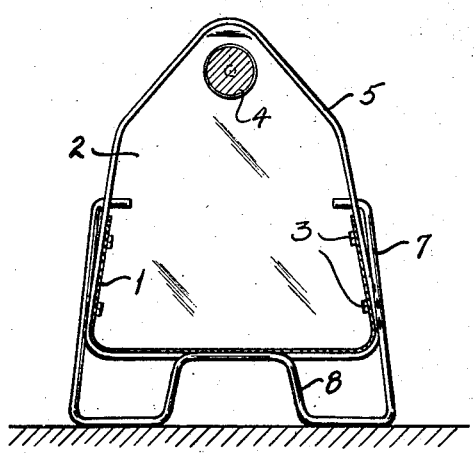

In the accompanying drawings illustrating a structure embodying our invention Figure 1 is a side elevational view of a complete feeder trough, the supporting legs being shown in one of their adjusted positions; Figure 2 is an end elevational view of one end of the trough, the legs being shown in another adjusted position; Figure 3 is a vertical section through the parts shown in Figure 4; Figure 4 is a sectional view on the line 4—4 of Figure 3; and Figure 5 is an end elevational view of the trough with the leg forming bail in a third adjusted position.

The feeder is provided with a trough portion 1 having its end closed by duplicate end portions or walls 2 secured in operative relation with the trough portion by means of clamping bolts 3. These end walls extend upwardly above the upper edge of the trough to form supports for the guard rail 4 which prevents the poultry from standing on the edges of the trough. The end walls are of a single sheet of metal drawn to the cup shape shown in the drawings and are provided with integrally formed bead portions 5 on their rims projecting beyond the lateral faces of the end portions as shown. Each end wall is also provided with a depression 6 at the top for the purpose hereinafter referred to.

Figure 5:
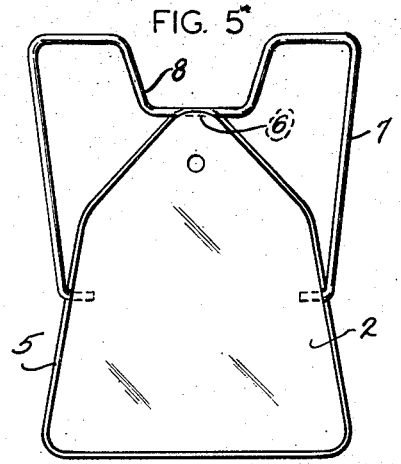

The legs at the ends of the trough, and by means of which its height may be quickly adjusted, are in the form of a bail 7 of spring wire or rod shaped as shown in Figures 4 and 5. These bails are hinged to the end portions of the trough by means of their terminal portions which extend through holes in said end portions and while the bails are formed of relatively stiff material their end portions are capable of springing apart sufficiently to pass over the beads 5 when the trough legs are rotated from the downward vertical position indicated in Figure 1, and in which their upper ends lie close to the surface of the flanged portion of the trough ends, to the angular position shown in Figures 2, 3, and 4, in which latter position the trough is supported nearer the floor or ground than when the legs are in an upright position as shown in Figure 1. The base of each bail is formed with a U-shaped bend or step 8, the steps being adapted to engage the bottom of the trough thus limiting the inward rotation of the bails to establish said lower adjusted position.

As a convenient means for suspending the trough from an overhead support and at any desired height, the trough supporting bails may be rotated to the position indicated in Figure 5 where the bottom portions of the U-bends are received and retained in the detent depressions 6 in the top surfaces of the end pieces 2. Bolt heads 3 prevent rotation of the legs in a direction away from the trough when the trough is to be maintained in the adjusted position of Figure 1 but the ends of the legs spring apart to pass over these bolt heads when force is applied to rotate the legs to the position shown in Figure 5.

Having fully described our invention, that which we claim as novel and desire to protect by Letters Patent of the United States is:

1. A feeder comprising an elongate trough having cup-shaped end walls receiving the ends of the trough and extending above the trough, each end wall having an outwardly extending bead at its rim, and being secured to the trough by headed fasteners whose heads define with said bead detents on opposite sides of the end wall, resilient bails pivotally connected to the respective end walls for swinging movement about horizontal axes transverse to the trough, each bail comprising a length of a resilient rod bent to provide a step extending from the base of the bail toward its pivotal axis, said bails being of such height as to support the trough in an elevated horizontal position when they extend generally vertically downward from their pivotal axes and being of such width as to be releasably engageable in said detents, the upper ends of each of said end walls being formed with detents for receiving the steps of the bails for releasably retaining the latter in position extending generally vertically upward from their pivotal axes.

2. A feeder comprising a trough having end walls which extend above the trough, resilient bails pivotally connected to the respective end walls of the trough for swinging movement about horizontal axes transverse to the trough, each bail comprising a length of resilient rod bent to provide a step extending from the base of the bail toward its pivotal axis, said bails being of such height as to support the trough in an elevated horizontal position when they extend generally vertically downward from their pivotal axes, detents formed on the sides of the end walls cooperative with the sides of the resilient bails for releasably holding them in position extending generally vertically downward from their pivotal axes, the bails being swingable from said position toward one another to angled positions for engagement of the steps with the bottom of the trough for supporting the trough in a lower elevated horizontal position, said bails also being swingable around the ends of the trough to a position wherein they extend generally vertically upward from their pivotal axes, and detents formed on the upper ends of the end walls releasably engageable with the steps of the bails for releasably holding the bails in said upwardly extending position.

3. A poultry feeder comprising an elongate trough having ends extending above the trough, a guard supported by said ends extending above the trough throughout its length, resilient bails pivotally connected to the sides of the trough adjacent its ends for swinging movement about horizontal axes transverse to the trough, each bail comprising a length of resilient rod bent to provide a step extending from the base of the bail toward its pivotal axis, said bails being of such height as to support the trough in an elevated horizontal position when they extend generally downwardly from their pivotal axes, detents at the sides of the trough below the pivots of the bails and cooperative with the sides of the bails for releasably holding them in position extending generally downward from their pivotal axes, the bails being swingable from said position toward one another to angled positions with their steps in engagement with the bottom of the trough for supporting the trough in a lower elevated horizontal position, the radius of each bail from its pivotal axis to its step being such in relation to the height of the ends of the trough that the bails are also swingable around the ends of the trough to a position wherein they extend generally upward from their pivotal axes.

GLENN C. PITTENGER.
ROY L. BRANDENBURGER.

REFERENCES CITED

The following references are of record in the file of this patent:

UNITED STATES PATENTS

| Number | Name | Date |
|---|---|---|
| 528,871 | Greer | Nov. 6, 1894 |
| 685,901 | Baker | Nov. 5, 1901 |
| 823,699 | Roemer | June 19, 1906 |
| 1,260,713 | Rood | Mar. 26, 1918 |
| 1,771,754 | Hauenstein | July 29, 1930 |
| 1,810,855 | Rockmore | June 16, 1931 |
| 1,855,781 | Tolley | Apr. 26, 1932 |
| 2,014,842 | Hinman | Sept. 17, 1935 |
| 2,342,180 | Crim | Feb. 22, 1944 |